United States Patent
Loos et al.

(10) Patent No.: US 10,751,744 B2
(45) Date of Patent: Aug. 25, 2020

(54) POWDER COATING SYSTEM FOR COATING WORKPIECES WITH COATING POWDER

(71) Applicant: Wagner International AG, Altstatten (CH)

(72) Inventors: Eugen Loos, Tettnang (DE); Joachim Hirt, Uhldingen-Muhlhofen (DE)

(73) Assignee: Wagner International AG, Altstatten (CH)

( * ) Notice: Subject to any disclaimer, the term of this patent is extended or adjusted under 35 U.S.C. 154(b) by 0 days.

(21) Appl. No.: 16/064,452

(22) PCT Filed: Dec. 1, 2016

(86) PCT No.: PCT/EP2016/025160
§ 371 (c)(1),
(2) Date: Jun. 20, 2018

(87) PCT Pub. No.: WO2017/108198
PCT Pub. Date: Jun. 29, 2017

(65) Prior Publication Data
US 2018/0369849 A1    Dec. 27, 2018

(30) Foreign Application Priority Data
Dec. 23, 2015   (EP) ..................................... 15202292

(51) Int. Cl.
*B05B 14/45*    (2018.01)
*F16L 43/00*    (2006.01)
(Continued)

(52) U.S. Cl.
CPC .............. *B05B 14/45* (2018.02); *B05B 14/43* (2018.02); *B05B 14/48* (2018.02); *B05B 16/60* (2018.02);
(Continued)

(58) Field of Classification Search
CPC ........ F16L 25/14; F16L 43/003; B05B 14/43; B05B 14/45; B05B 14/48; B05B 14/60
(Continued)

(56) References Cited

U.S. PATENT DOCUMENTS 2,753,996 A * 7/1956 Fritz Kaiser .............. B07B 7/08
    209/139.1
2,936,043 A * 5/1960 Armstrong ................ B04C 5/13
    55/416

(Continued)

FOREIGN PATENT DOCUMENTS

AT      183207 B       9/1955
CN      205252071   *  5/2016  ................ A61J 3/06
(Continued)

OTHER PUBLICATIONS

International Search Report for corresponding Int. App. No. PCT/EP2016/025160, dated Jun. 13, 2017.

*Primary Examiner* — Terrell H Matthews
(74) *Attorney, Agent, or Firm* — Renner, Otto, Boisselle & Sklar, LLP

(57) ABSTRACT

The powder coating system according to the invention for coating workpieces with coating powder has a coating cubicle (3) and a cyclone separator (5), the coating cubicle (3) being connected to the cyclone separator (5) via a residual powder pipe (4). The cyclone separator (5) comprises in its inlet region an outlet tube (23) in which there is disposed a guide apparatus (50) that has multiple blades (51). These are designed so that the air vortex (28) impinging on the blades (51) can be deflected into a vertical air stream (30).

16 Claims, 14 Drawing Sheets

(51) Int. Cl.
  *F16L 45/00*      (2006.01)
  *F16L 25/14*      (2006.01)
  *B05B 16/60*      (2018.01)
  *B05B 14/48*      (2018.01)
  *B05B 14/43*      (2018.01)
  *B04C 5/13*       (2006.01)

(52) U.S. Cl.
  CPC ............. *F16L 25/14* (2013.01); *F16L 43/003* (2013.01); *F16L 45/00* (2013.01); *B04C 2005/136* (2013.01)

(58) Field of Classification Search
  USPC ............................... 209/47, 49, 60, 713, 715
  See application file for complete search history.

(56) References Cited

U.S. PATENT DOCUMENTS

| | | | | |
|---|---|---|---|---|
| 3,169,842 | A | * | 2/1965 | Streete ................ B04C 5/14 55/449 |
| 5,288,111 | A | | 2/1994 | Store |
| 5,466,372 | A | * | 11/1995 | Jerabek ............... B04C 5/081 210/512.1 |
| 5,725,670 | A | * | 3/1998 | Wilson .................. B05B 5/032 118/629 |
| 6,258,146 | B1 | | 7/2001 | Semedard |
| 6,951,354 | B1 | * | 10/2005 | Paulson ............... B65G 53/523 285/179 |
| 2007/0234691 | A1 | * | 10/2007 | Han ..................... B01D 45/16 55/457 |
| 2010/0255975 | A1 | * | 10/2010 | Mauchle .............. B05B 7/1454 494/2 |
| 2011/0308437 | A1 | * | 12/2011 | Latta .................... B07B 7/02 110/232 |
| 2012/0012687 | A1 | * | 1/2012 | Vierstra ................ B02C 23/10 241/79 |

FOREIGN PATENT DOCUMENTS

| | | | |
|---|---|---|---|
| DE | 1507817 A1 | 1/1970 | |
| DE | 7014433 U * | 9/1970 | ............... A61J 3/06 |
| DE | 7014433 U | 9/1970 | |
| DE | 4112423 A1 | 10/1992 | |
| DE | 29501148 U1 | 7/1995 | |
| DE | 102009016045 A1 | 10/2010 | |
| EP | 0771991 A1 | 5/1997 | |
| EP | 1020228 A | 7/2000 | |
| EP | 1319442 A1 | 6/2003 | |
| EP | 1319442 A1 * | 6/2003 | ............ B01D 45/12 |
| EP | 2784471 A1 | 10/2014 | |
| IT | MI20111368 A1 | 1/2013 | |
| JP | S52149666 A | 12/1977 | |
| JP | S5664760 U | 3/1981 | |
| JP | S56100662 A | 8/1981 | |
| WO | 2009127192 A1 | 10/2009 | |

* cited by examiner

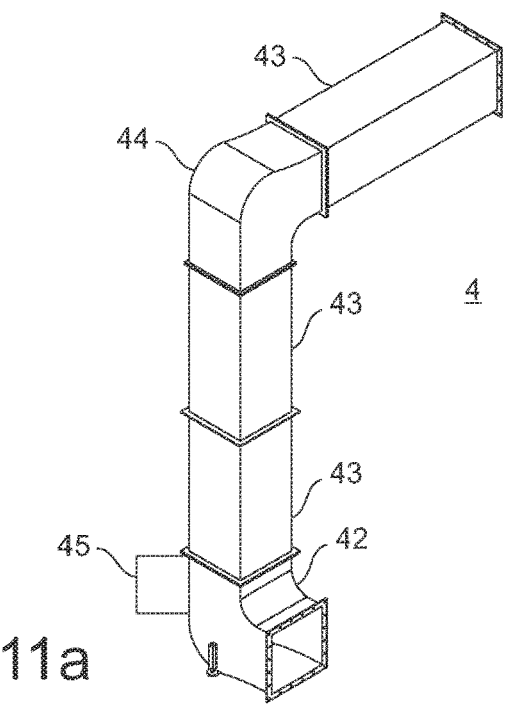
Fig. 11a
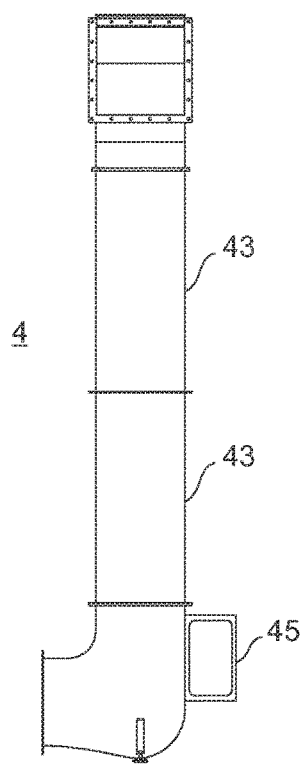 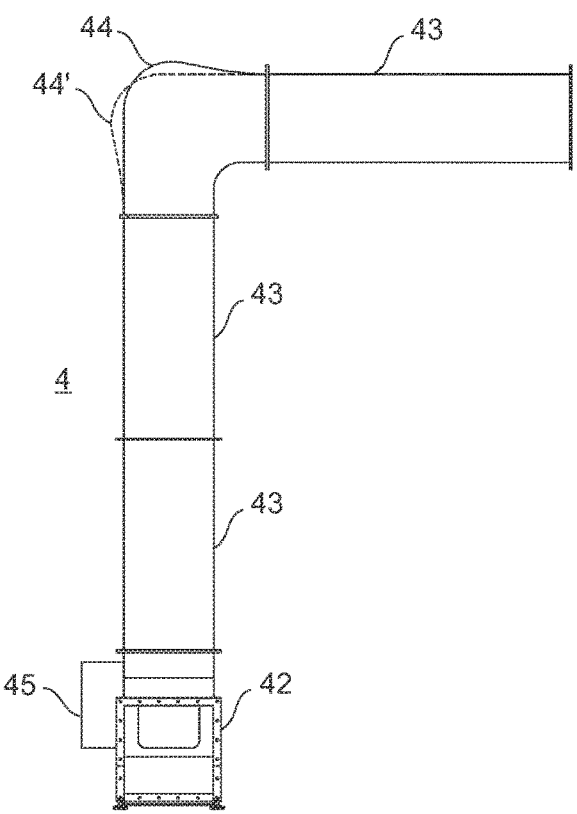
Fig. 11b          Fig. 11c

POWDER COATING SYSTEM FOR COATING WORKPIECES WITH COATING POWDER

TECHNICAL FIELD

The invention relates to a powder coating system for coating workpieces with coating powder.

PRIOR ART

In the electrostatic coating of workpieces with powder, the powder is sprayed onto the workpiece to be coated via one or more powder spray guns. During the coating process the workpieces to be coated are usually located within a powder coating cubicle, which hereinafter will also be referred to as a cubicle. Since during the coating process not all the powder particles sprayed by the spray guns adhere to the workpieces to be coated, the excess powder, which is also referred to as overspray, must be removed from the cubicle. This is necessary in part because the environment outside the cubicle is to be kept free of powder dust. On the other hand, the danger of explosion increases when exceeding a certain powder concentration by the powder dust cloud floating in the cubicle. This should be avoided. Also, extracting excess powder from the interior of the cubicle during operation is advantageous in that, when changing color, the required cleaning measures take less time, because principally there is less residual powder in the cubicle.

If the cubicle and the extraction system are not cleaned sufficiently, a color change can result in undesirable color carryover.

In order to remove the overspray from the cubicle, it is sucked together with the air in the cubicle as a powder-air mixture from the cubicle and fed to a cyclone separator, which may be designed as a mono-cyclone separator. Such a cyclone separator is known from the publication EP 1 319 442 A1. The powder-air mixture flows tangentially into the cyclone separator and in the cyclone separator helically downwards. In this case, the powder particles are forced outwards in the direction of the outer wall of the cyclone separator by the centrifugal force arising during the rotation of the powder-air stream. The powder particles are conveyed downwards in the direction of the powder outlet of the cyclone separator and collected there, the air freed from the powder particles is sucked off via the central tube. The air stream cleaned in this way is frequently fed to a post-filter in order to filter out the residual powder remaining in the air.

Generally, this requires between 15,000 and 30,000 m³ of air per hour, which are provided by an electrically operated fan or blower. The associated energy costs are not insignificant.

SUMMARY OF THE INVENTION

An object of the invention is to provide a powder coating system for coating workpieces with coating powder, in which the energy consumption of the powder coating system is minimized. In particular, the (electrical) power requirement for the provision of the suction air for the cyclone separator should be minimized. However, this should not be at the expense of the time required for a color change. This is to say that the color change should be able to proceed just as fast or even faster, without causing a color carryover.

Advantageously, the powder coating system is optimized in terms of flow such that no or very little powder can be deposited or sintered. This also serves the rapid color change without color carryover. The time required for cleaning the powder coating system is minimized.

The object is achieved by a powder coating system for coating workpieces with coating powder having the features specified in claim 1.

The powder coating system according to the invention for coating workpieces with coating powder has a coating cubicle and a cyclone separator, wherein the coating cubicle is connected to the cyclone separator via a residual powder pipe. The cyclone separator comprises in the outlet tract an outlet tube in which there is disposed a guide apparatus, which has multiple blades. These are designed such that the air vortex impinging on the blades can be at least partially deflected into an eddy-free air stream.

If the longitudinal axis of the guide apparatus extends vertically, the blades are designed such that the air vortex impinging on the blades can be deflected at least partially into a vertical air stream.

Advantageous further developments of the invention will become apparent from the features indicated in the dependent claims.

In an embodiment of the powder coating system according to the invention, the blades are disposed radially to the longitudinal axis of the guide apparatus. Such a guide apparatus can be manufactured easily and inexpensively.

In a further embodiment of the powder coating system according to the invention, the blades are curved in the inlet region. If the longitudinal axis of the guide apparatus extends vertically, the curved portion is located at the bottom of the blades. As a result, the air vortex can be deflected even better into a vertical air stream. The air does not bounce against the blades, but hits them at a shallow angle, further reducing energy losses.

It is advantageous if at least one of the blades in the inlet region and the longitudinal axis of the guide apparatus form an angle between 40° and 70° and even better angles between 53° and 60°.

In an additional embodiment of the powder coating system according to the invention, the blades are designed to be rectilinear in the outlet region. If the longitudinal axis of the guide apparatus extends vertically, the rectilinear region is located at the top of the guide blades. In doing so, the air vortices are better deflected into a vertical air stream also.

In addition, it can be provided in the guide apparatus of the powder coating system according to the invention that at least some of the blades in the outlet region have a surface which is aligned parallel to the longitudinal axis.

In a further development of the powder coating system according to the invention, the guide apparatus tapers on its downstream side. If the guide apparatus is disposed vertically, it can be provided that it tapers towards the top. As a result, stalls are avoided at the upper end of the guide apparatus.

In another further development of the powder coating system according to the invention, the guide apparatus has a holder by means of which it can be disposed in the outlet tube. This is especially useful for retrofitting a cyclone separator. The holder may be provided, for example, at the top, at the bottom or at the side of the guide apparatus.

In addition, it can be provided in the powder coating system according to the invention that the guide apparatus tapers on its upstream side. If the guide apparatus is disposed vertically, it can be provided that it tapers downwards. As a result, the rising air does not bounce against the bottom of the guide apparatus, but hits it at a shallow angle, so that the energy losses can be further reduced.

In addition, it can be provided in the powder coating system according to the invention that a fan-shaped guide blade is provided in the inlet tract of the cyclone separator.

In the powder coating system according to the invention, it is also possible that the fan-shaped guide blade is disposed tangentially to the powder-air stream entering the cyclone separator.

In a further development of the powder coating system according to the invention, in each case a residual powder pipe is disposed along the longitudinal sides of the coating cubicle. In addition, a collecting tube is provided which extends transversely to the residual powder pipes and into which the residual powder pipes open. The collecting tube has a cross section that widens substantially continuously over the length of the collecting tube. Because the two residual powder pipes disposed on the longitudinal sides of the coating cubicle now each suck off the same amount of air, the sizing of the air to be sucked from the cubicle is no longer based on the residual powder pipe with the lower suction power. Thus, the amount of air sucked out of the cubicle per unit of time can be reduced, which further reduces the energy consumption of the system.

In addition, a powder coating system for coating workpieces with coating powder is proposed which has a coating cubicle and a cyclone separator and/or a filter.

The coating cubicle is connected to the cyclone separator or the filter via a residual powder pipe. The residual powder pipe has at least one bend in order to deflect the powder-air stream. The bend comprises a short, curved outer wall and a long, curved outer wall, the long, curved outer wall having a bulge.

Finally, it can be provided in the powder coating system according to the invention that the bend has an internal curve which is part of the short outer wall. In addition, the bend has an outer curve, which is part of the long outer wall. The long outer wall has a straight section tangentially followed by the outer curve.

BRIEF DESCRIPTION OF THE DRAWINGS

In the following the invention will be explained by means of several exemplary embodiments with reference to several figures.

FIGS. 11a, 11b and 11c show another possible embodiment of the pipe for the residual powder-air stream in a three-dimensional view and in two side views.

EMBODIMENTS OF THE INVENTION

Figure 1:
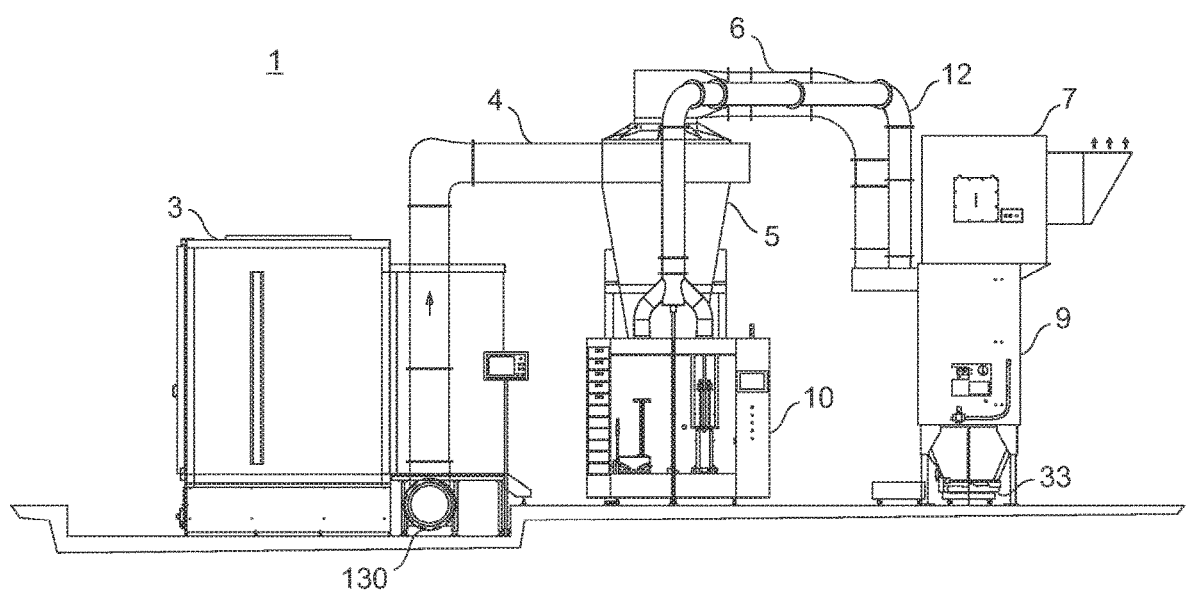
FIG. 1 shows a possible embodiment of a powder coating system for coating workpieces with coating powder in a side view.
Figure 2:
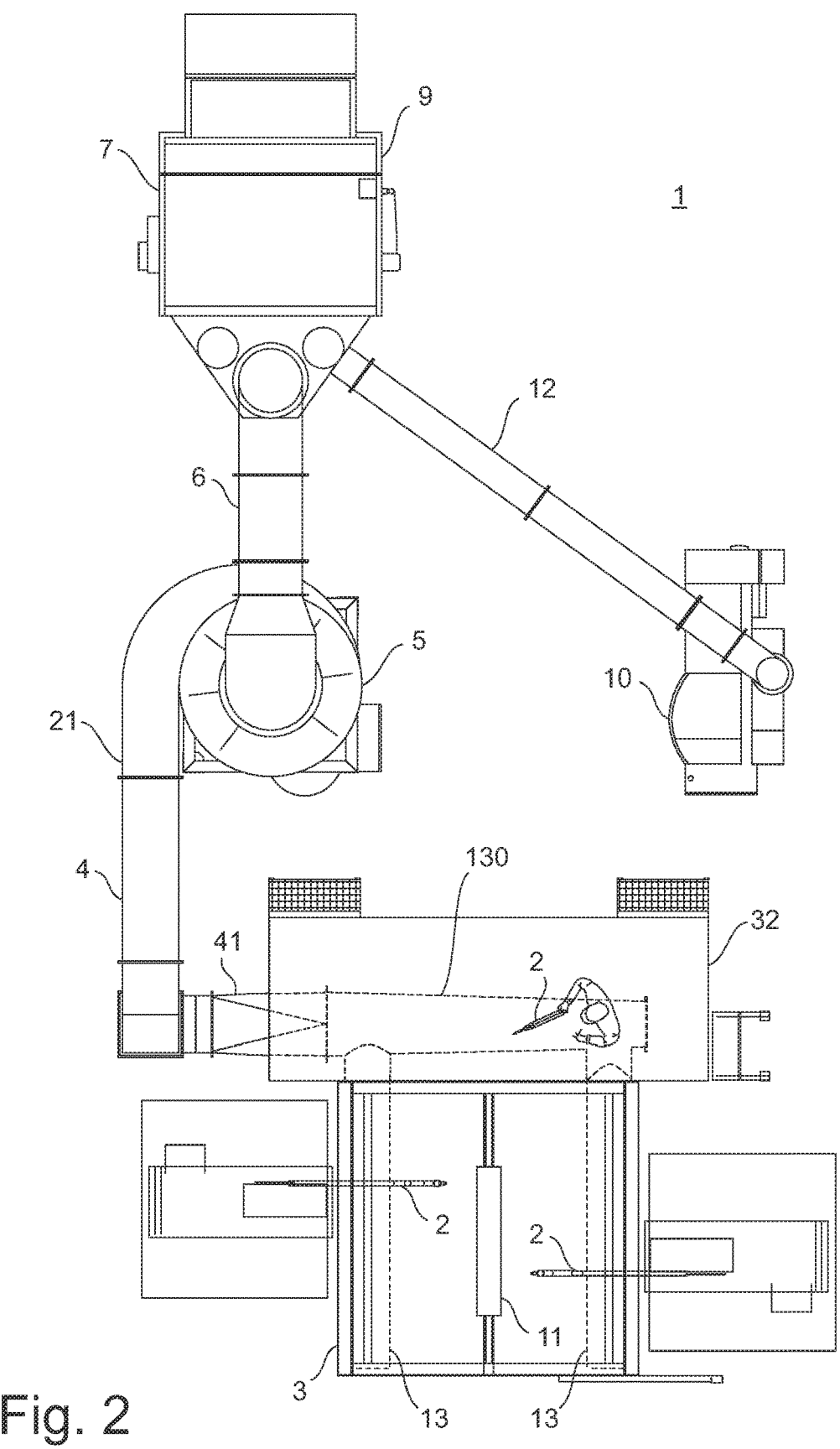
FIG. 2 shows the powder coating installation for coating workpieces with coating powder in a plan view.

FIG. 1 shows a possible embodiment of a powder coating system 1 for coating workpieces 11 with coating powder in a side view and in FIG. 2 in a plan view. The powder coating system 1 comprises a coating cubicle 3, through which a workpiece 11 to be coated is transported. By means of spray guns 2 projecting laterally into the cubicle 3, the workpiece 11 can be sprayed with coating powder. The spray guns 2 may be attached to a linear stroke device, which serves to move the spray guns 2 up and down, so that larger workpieces can be sprayed also. The supply of the spray guns 2 with coating powder takes place via a powder center 10. The overspray arising from the coating together with the air present in the cubicle 3 are sucked from the cubicle 3 as a powder-air mixture and fed to a cyclone separator 5 via a residual powder pipe 4. The powder-air mixture in the residual powder pipe 4 is also referred to as residual powder air stream. The cyclone separator 5 is designed as a monocyclone separator. In the cyclone separator 5, the powder particles are separated from the air and collected in the bottom of the cyclone separator. The recovered powder can be used again for coating, if necessary. For this purpose, the powder outlet 25 of the cyclone separator 5 can be connected to the powder center 10 via a powder line for recycled powder (not shown in the figures). The air freed from most powder particles is fed to a post-filter 9 via a pipe 6. The post-filter 9 may be equipped with filter cartridges that filter out the residual powder particles remaining in the air. A preferably electrically driven fan or blower 7 provides the necessary air stream.

Figure 3:
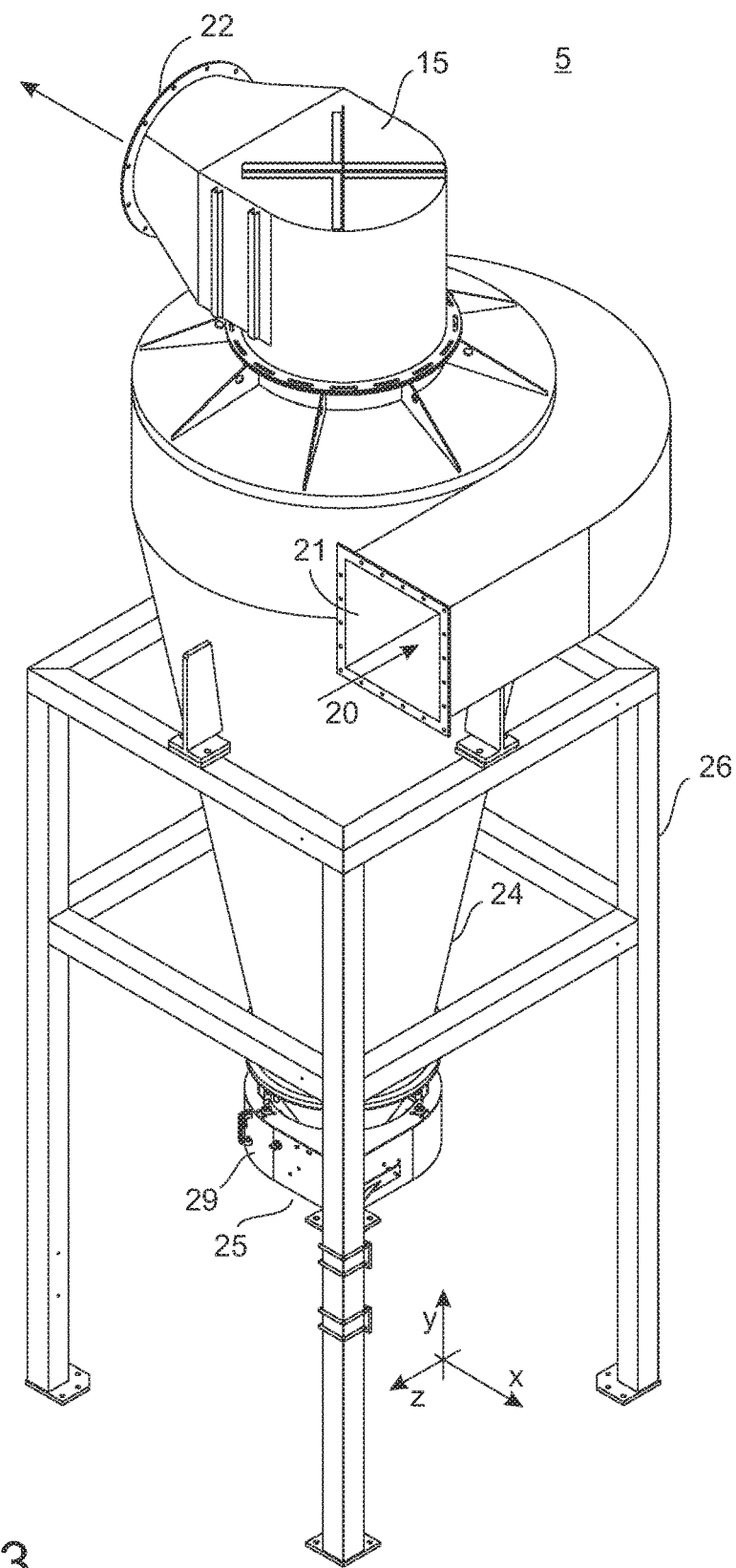
FIG. 3 shows a possible embodiment of a cyclone separator in a three-dimensional view.
Figure 4A:
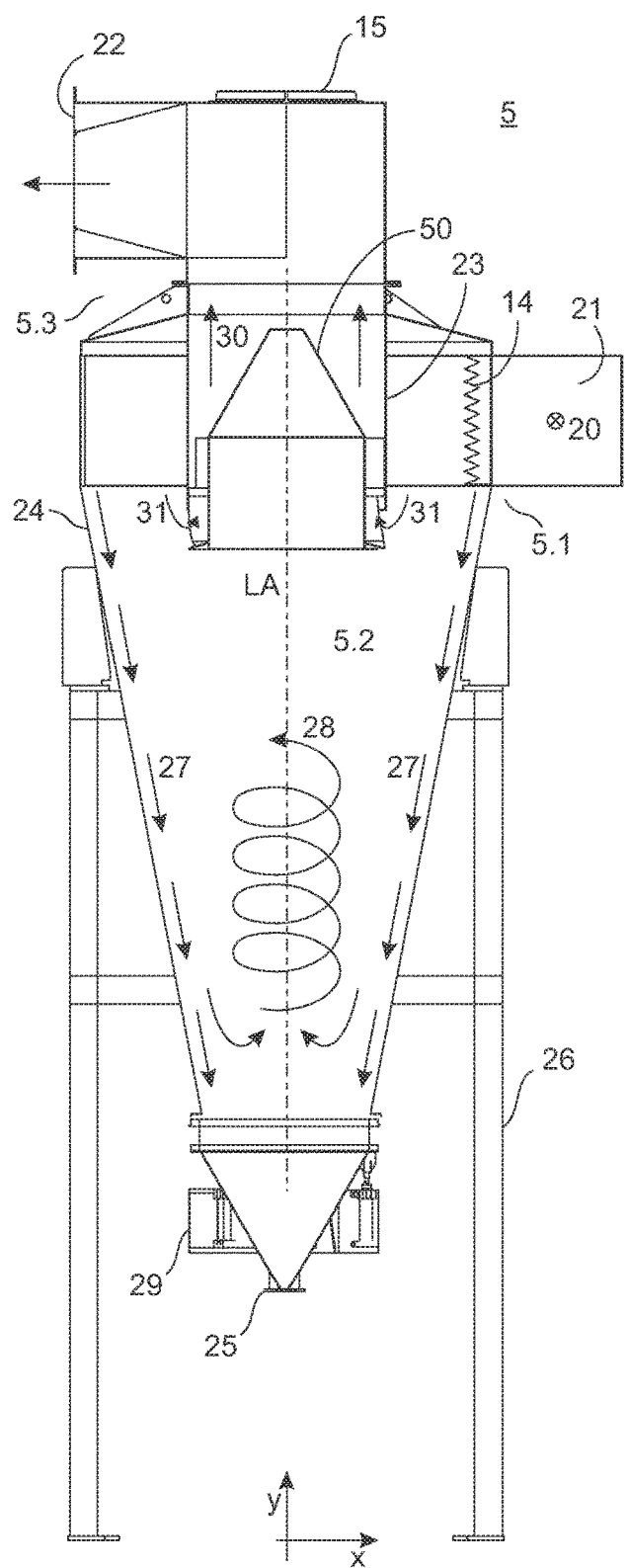
FIGS. 4a and 4b show the cyclone separator in longitudinal section and in a three-dimensional view in section, respectively.
Figure 4B:
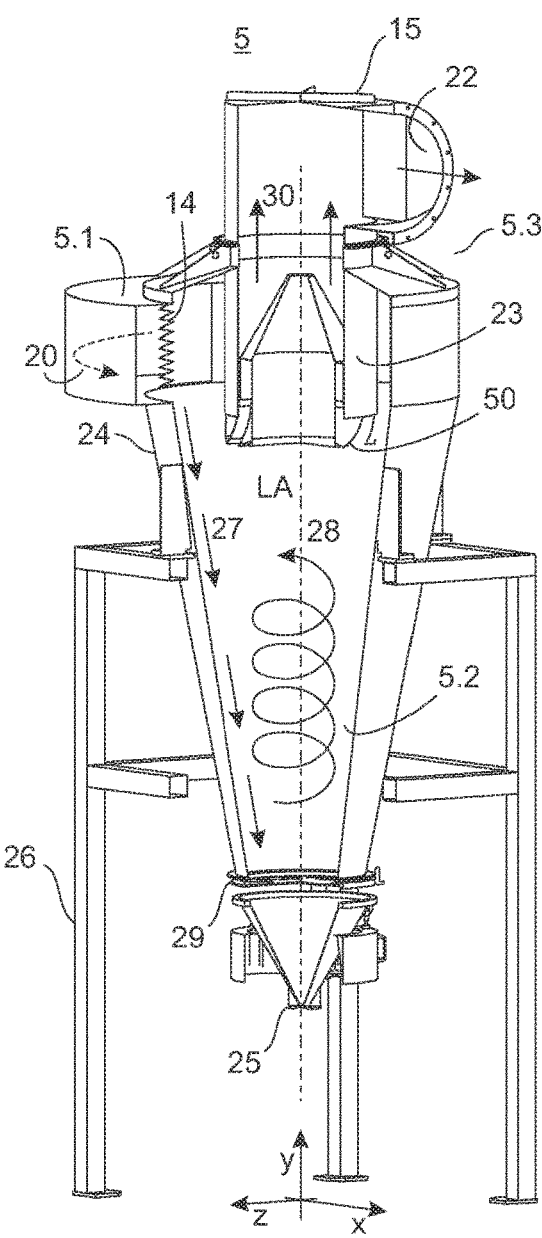

FIG. 3 shows a possible embodiment of the cyclone separator 5 in a three-dimensional view. FIGS. 4a and 4b show the cyclone separator 5 in longitudinal section and in a three-dimensional view section, respectively. The powder-air mixture fed to the cyclone separator 5 via the residual powder pipe 4 flows tangentially at the inlet 21 in the inlet tract 5.1 of the cyclone separator 5, which, in each case, is shown schematically in FIGS. 4a and 4b with an arrow. In this case, the powder-air mixture 20 flows past an air guide blade 14 and then in the cyclone separator 5 helically downwards into the separation tract 5.2 of the cyclone separator 5. The powder particles are forced outwards to the outer wall 24 of the cyclone separator 5 by the centrifugal force arising during the rotation of the air stream. Due to gravity and the downwardly directed air stream, the powder particles in the region of the outer wall 24 are conveyed downwards in the direction of the powder outlet 25 of the cyclone separator and collected there. This is represented schematically by the arrows 27. A sieve 29 may be located at the bottom of the cyclone separator 5. The thus recovered and sieved powder can be removed via the powder outlet 25 of the cyclone separator. The air freed from most powder particles air is sucked off via the outlet tube 23 disposed in the outlet tract 5.3 of the cyclone separator 5 and a guide apparatus 50 and then reaches the outlet 22 of the cyclone separator.

The outlet tube 23 may, for example, have a length of 800 to 1100 mm and a diameter of 480 to 900 mm. The length of the outlet tube 23 depends, inter alia, on the height of the cyclone separator 5. Through a series of experiments it has been found that there is a relationship between the degree of separation of the outlet tube 23 and the separation in the main stream. With increasing length of the outlet tube 23, the degree of separation does indeed increase in the outlet tube 23, the separation in the main stream, however, is thereby adversely affected.

The outlet tube 23 is preferably disposed so that its longitudinal axis extends parallel to the longitudinal axis of the cyclone separator 5. In addition, it is generally advantageous if the longitudinal axis of the outlet tube 23 coincides with the longitudinal axis of the cyclone separator 5, so that the outlet tube 23 is disposed centrally in the cyclone separator 5 and in the outlet tract 5.3 of the cyclone separator 5, respectively.

The guide apparatus 50 preferably protrudes from the bottom of the outlet tube 23 at least 100 mm. As a result, the air vortex 28 has the opportunity to apply itself to the blades 51. This prevents the air vortex 28 from being negatively influenced by the secondary stream 31. If the guide apparatus 50 did not protrude from the outlet tube 23, the secondary stream 31 could influence the stream angle of the air vortex 28 in such a way that shock losses occur. The shock losses would arise if the stream does not hit the blade 51 under the blade angle E.

The guide apparatus 50 is disposed for the most part or entirely in the outlet tube 23. A possible installation position of the guide apparatus 50 is shown in FIGS. 4a and 4b.

Figure 5A:
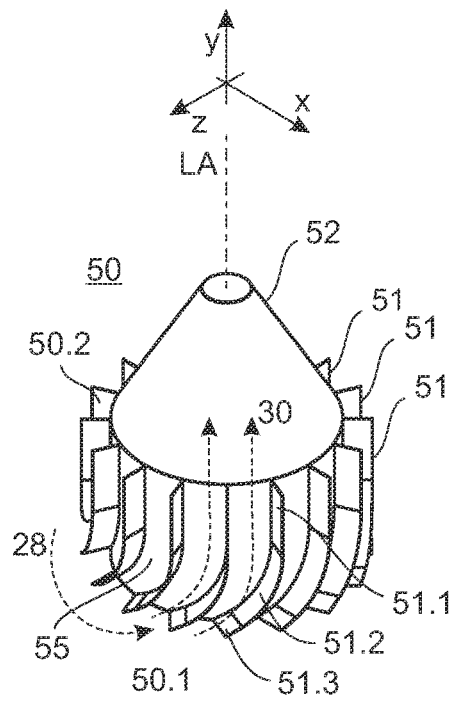
FIGS. 5a, 5b and 5c show a first possible embodiment of a guide apparatus which can be installed in the cyclone separator.
Figure 5B:
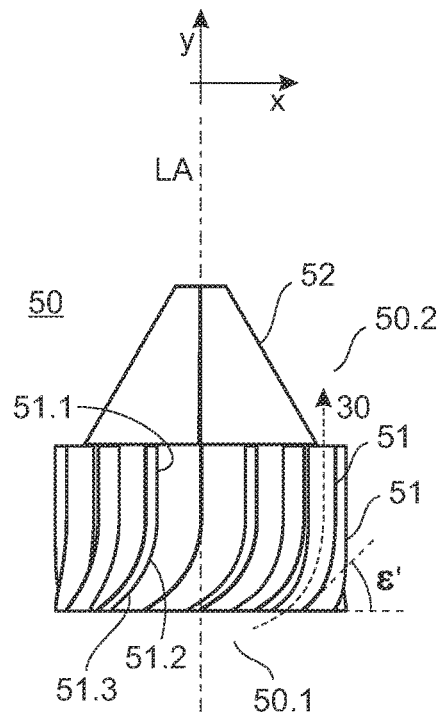
Figure 5C:
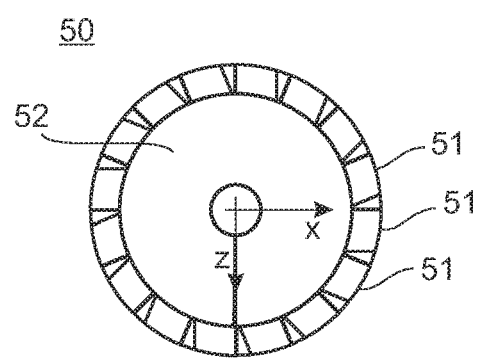

FIGS. 5a, 5b and 5c show a first possible embodiment of the guide apparatus 50 which can be installed in the cyclone separator 5. The structure of the guide apparatus 50 is advantageously rotationally symmetrical and has a longitudinal axis LA. It has a cylindrical core 55 with a cone or truncated cone 52 on top. At the bottom the core 55 may be closed with a flat surface. This is not mandatory, but advantageous, because then no residual powder can deposit in the interior of the core 55 and the rising air stream can not be caught there. The course of the air stream through the guide apparatus along the guide blades 51 is shown schematically in FIG. 5a by the two dashed arrows.

The guide apparatus 50 also has a number of guide blades 51, which are here also referred to as blades in short. These can be attached to the outside of the core 55.

Instead, it is also possible to attach the guide blades 51 to the outlet tube 23. Some or all of the guide blades 51 can also be attached both to the core 55 and to the outlet tube 23. The guide blades 51 can be attached by welding, for example.

When the guide apparatus 50 is pushed into the outlet tube 23, it is advantageous if between the guide blades 51 and the outlet tube 23 there are no or minimal air gaps.

The entire guide apparatus or parts thereof can be made of steel, aluminum or conductive plastic, for example. Welding, casting or rapid manufacturing, such as sintering or 3D printing, are conceivable, for example, as the manufacturing method.

The guide blades 51 are preferably disposed equidistant from one another.

Below, the shape of the guide blades 51 will be explained with reference to a blade. Preferably, all blades 51 have the same shape. In the lower region 51.3 the blade 51 has a flat surface which is slightly inclined relative to the horizontal plane. Preferably, together with the horizontal it forms an angle $\varepsilon'$ between 20° and 50°, even better between 30° and 37°. The angle $\varepsilon'$ is also referred to as the angle of inflow. With reference to the longitudinal axis LA of the guide apparatus 50, this means that the guide blade 51 and the longitudinal axis LA form an angle $\varepsilon$ ($\varepsilon=90°-\varepsilon'$) between 40° and 70° and even better between 53° and 60°. This inclined surface 51.3 is followed by a curvature in the central region 51.2 a. In the upper Region 51.1, the guide blade 51 has a flat, vertical surface 51.1.

At its lower end the curved surface 51.2 can tangentially transition into the planar surface 51.3, and/or at its upper end it can transition into the vertical surface 51.1. In this way, edges are avoided at the transitions of the surfaces 51.1 to 51.2 and 51.2 to 51.3, so that there the risk of powder deposition is reduced.

In a further embodiment of the guide blade 51, the flat surface is absent in the lower region 51.3. Instead, the guide blade is already curved at the lower end and then transitions at the top into the flat, vertical surface 51.1.

In another embodiment of the guide blade 51, both flat surfaces are missing. Instead, the guide blade is already curved at the lower end and the curvature extends to the upper end of the guide blade. There, the guide blade is curved so that the tangent of the curvature is substantially vertical.

The guide blades 51 are preferably disposed radially on the lateral surface of the core 55, i.e. rectilinearly starting from the center of the core 55. In one embodiment of the guide apparatus 16 blades are provided. Preferably, the number of blades is between 10 and 25.

The purpose of the guide blades 51 is to dissolve the rising air vortex 28 (see FIGS. 4a and 4b) and to convert it as far as possible into a vertically directed air stream 30. The air stream is thus essentially free of eddies when it has passed the guide blades 51 in the outlet region 50.2.

When the air streams past the blades 51, vortex shedding may occur in the outlet region 50.2 of the blades 51. However, these are not relevant here.

Before the upwardly rising air vortex 28 reaches the guide apparatus 50, it has a kinetic energy composed of a vertical (translational) portion and a rotational portion. By means of the guide apparatus 50, this rotational component of the kinetic energy is now converted into an additional translational kinetic energy. Thus, the rotational portion of the kinetic energy is not destroyed or converted into heat energy, but as mentioned, into an additional translational kinetic energy. This has the advantage, among other things, that the energy efficiency of the cyclone separator and thus also of the entire powder coating system increases.

In principle, the longitudinal axis of the cyclone separator 5 does not have to be vertically aligned, as shown in FIGS. 1 to 4. The cyclone separator 5 can also be disposed obliquely or horizontally so that its longitudinal axis extends obliquely or horizontally. In this case, the longitudinal axis of the outlet tube 23 and the longitudinal axis of the guide tube 50 correspondingly extend obliquely or horizontally.

Instead of the guide apparatus 50, another embodiment of the guide apparatus can also be disposed in the outlet tube 23. Below, various possible embodiments of the guide apparatus will be described.

Figure 6A:
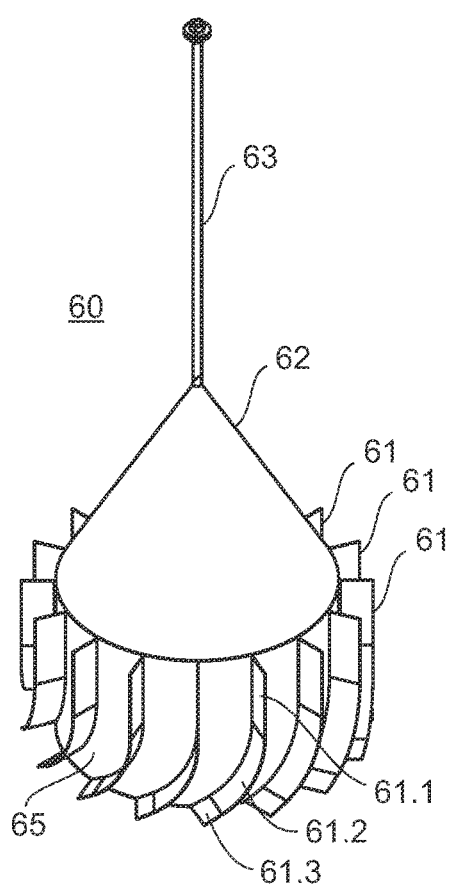
FIGS. 6a, 6b and 6c show a second possible embodiment of the guide apparatus which can be installed in the cyclone separator.
Figure 6B:
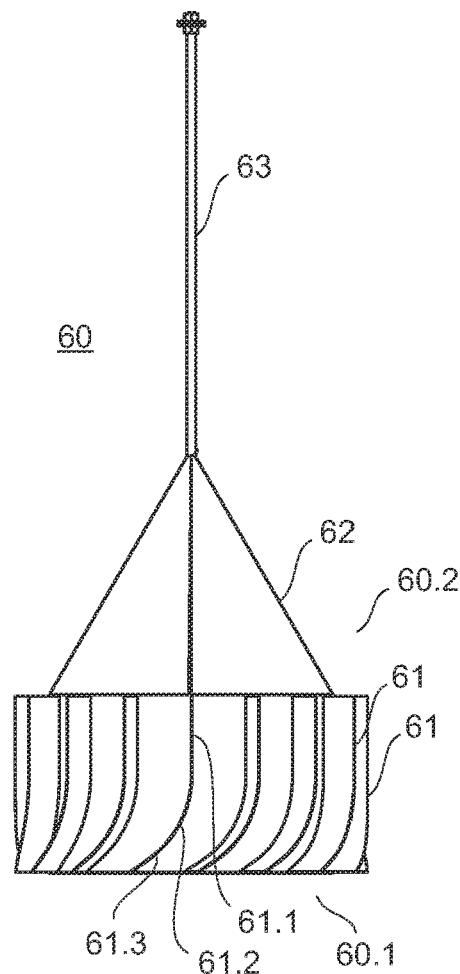
Figure 6C:
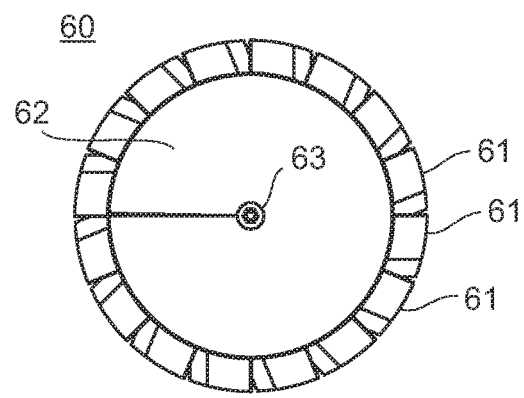

FIGS. 6a, 6b and 6c show a second possible embodiment of a guide apparatus 60 that can be installed in the cyclone separator 5 in a three-dimensional view, in a side view and in a plan view. The guide apparatus 60 differs from the guide apparatus 50 in that it has a holder 63 at the upper end of the cone 62. This holder can be designed as a support rod. At its upper end, it can be attached to the top of the lid 15 of the cyclone separator 5. This variant is particularly advantageous for retrofitting a cyclone separator. The guide apparatus 60 is merely pushed into the outlet tube 23 and secured by means of the holder 63.

Instead of installing the guide apparatus 60 at a fixed height in the outlet tube 23, it can also be adjustable in height. The holder 63 may be designed as a threaded rod with nut from which then the guide apparatus 60 is suspended. The position of the guide apparatus 60 in the outlet tube 23 can be adjusted manually via the nut. Alternatively, the holder 63 may have a tongue and groove system with lock to be able to adjust the position of the guide apparatus 60.

Figure 7A:
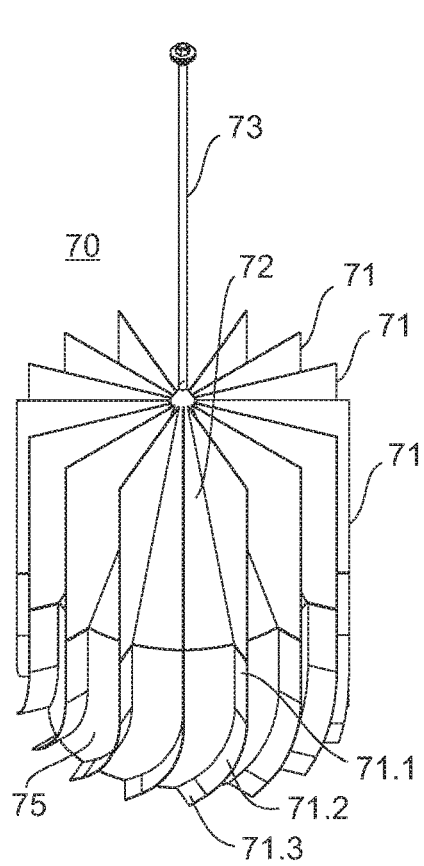
FIGS. 7a, 7b and 7c show a third possible embodiment of the guide apparatus which can be installed in the cyclone separator.
Figure 7B:
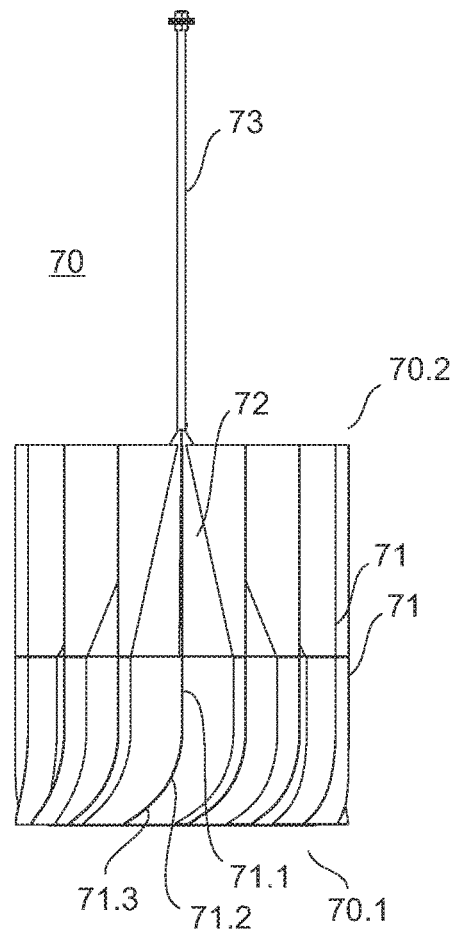
Figure 7C:
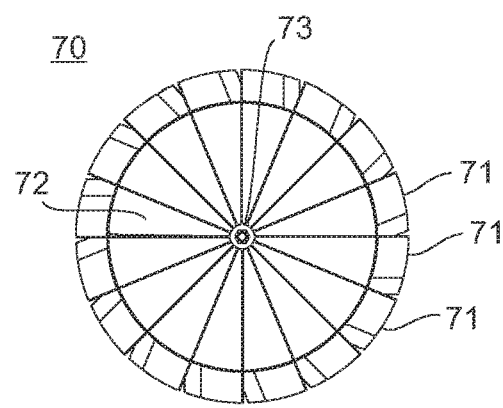

FIGS. 7a, 7b and 7c show a third possible embodiment of a guide apparatus 70 which can be installed in the cyclone separator 5 in a three-dimensional view, in a side view and in a plan view. The guide apparatus 70 has, just like the guide apparatus 60, a holder 73 so that it can be attached to the top of the lid 15 of the cyclone separator 5. In contrast to the guide apparatus 60, in the guide apparatus 70 the guide blades 71 extend to the upper end of the cone 72. This embodiment has the advantage that the air stream, despite the low overall height of the guide apparatus 70, has a longer stabilization path. The region of the stabilization path is thus extended by the amount of the height of the cone. Thereby, the efficiency of the guide apparatus increases.

Figure 8A:
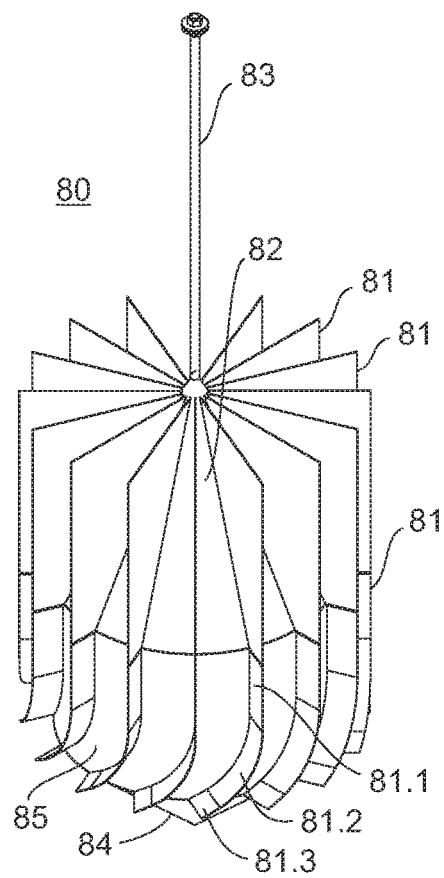
FIGS. 8a, 8b and 8c show a fourth possible embodiment of the guide apparatus which can be installed in the cyclone separator.
Figure 8B:
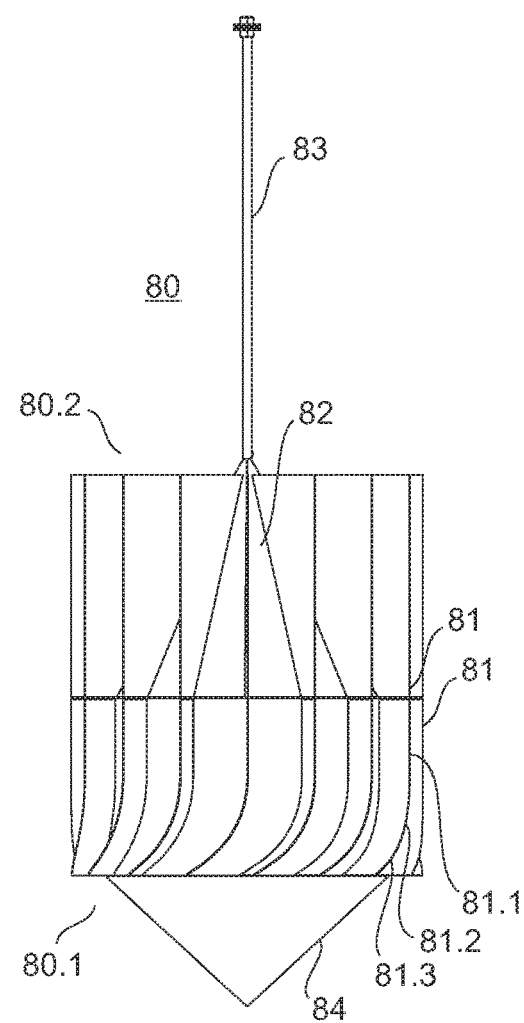
Figure 8C:
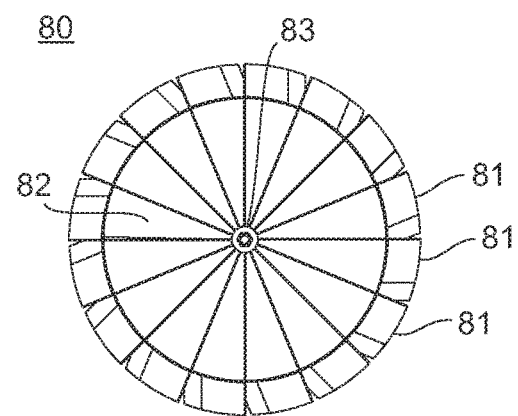

FIGS. 8a, 8b and 8c show a fourth possible embodiment of a guide apparatus 80 which can be installed in the cyclone separator 5 in a three-dimensional view, in a side view and in a plan view. Compared to the guide apparatus 70, the guide apparatus 80 additionally has a cone 84 at the bottom. In this configuration, the stream is specifically directed to the trajectory of the blades 81. As a result, both narrower and wider inner vortices are guided to the blades 81. If the guide apparatus were flat at the bottom, losses would be caused by the bounce of the stream on the flat bottom. By means of the cone or truncated cone disposed at the bottom, such bounce losses can be minimized.

Figure 9A:
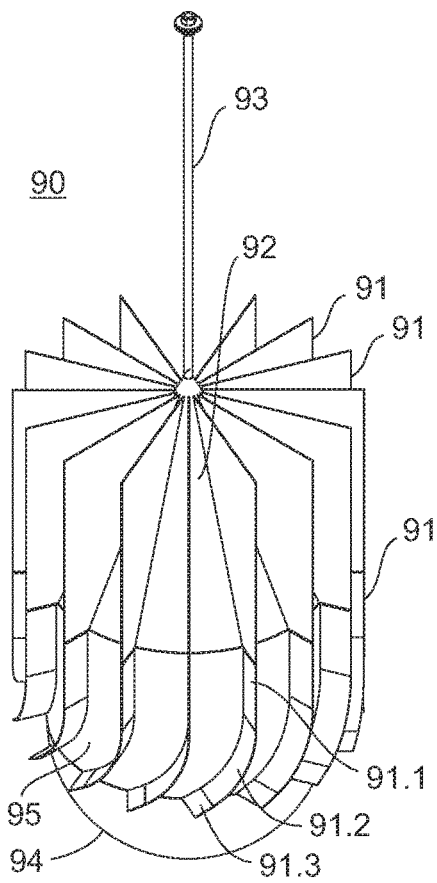
FIGS. 9a, 9b and 9c show a fourth possible embodiment of the guide apparatus which can be installed in the cyclone separator.
Figure 9B:
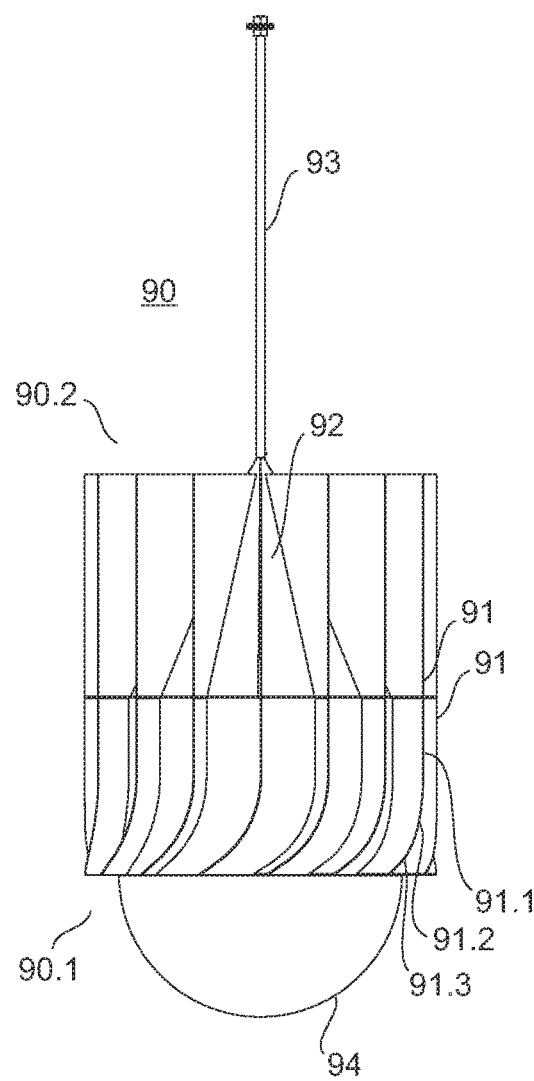
Figure 9C:
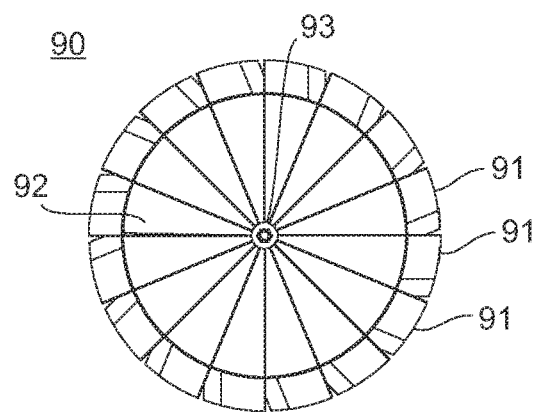

FIGS. 9a, 9b and 9c show a fourth possible embodiment of a guide apparatus 90 which can be installed in the cyclone separator 5 in a three-dimensional view, in a side view and in a plan view. Compared to guide apparatus 80, the guide apparatus 90 has a shell 94 at the bottom instead of the cone. The shell 94 has the same purpose as the cone 84 and a truncated cone, respectively. The curvature of the shell 94 may be hemispherical, for example.

The individual components of a guide apparatus can also be used in one of the other guide apparatuses. For example, the cone 84 of the guide apparatus 80 may also be used at the bottom of the guide apparatus 50. The components of the guide apparatuses can be combined with each other in any way.

Figure 10A:
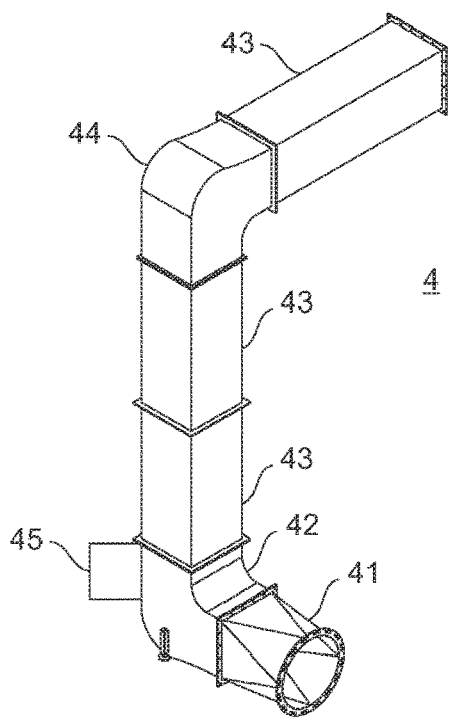
FIGS. 10a, 10b and 10c show a possible embodiment of a pipe for the residual powder-air stream with a pipe adapter in a three-dimensional view and in two side views.
Figure 10B:
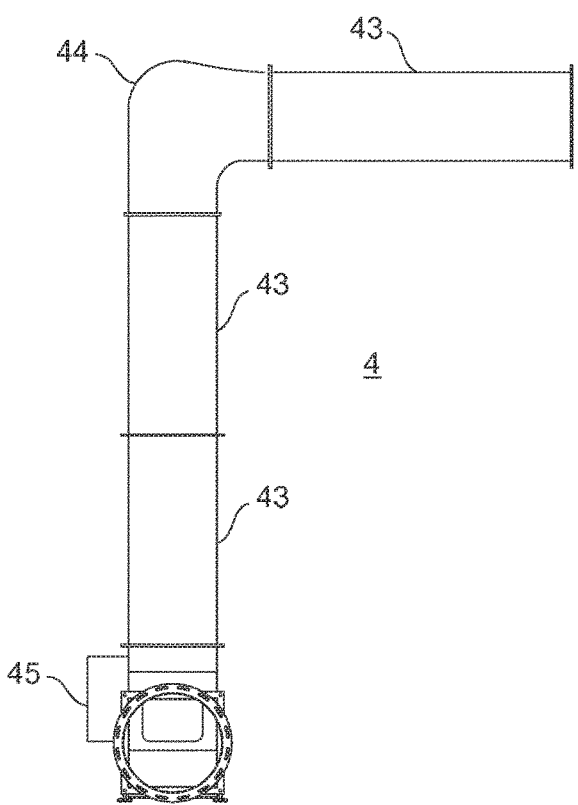
Figure 10C:
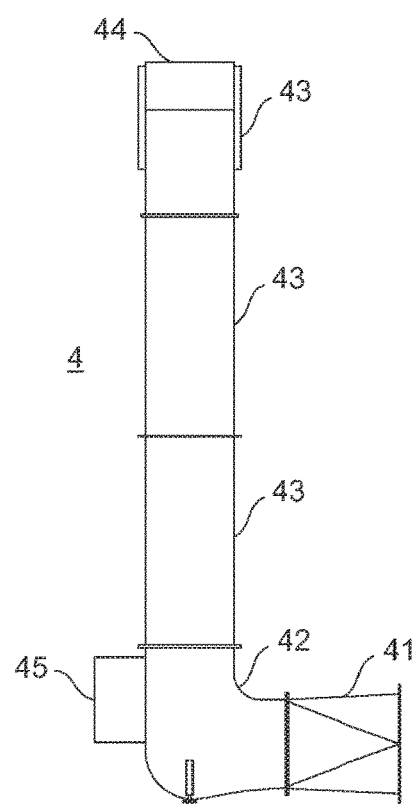

FIGS. 10a, 10b and 10c show a possible embodiment of a portion of the pipe 4 for the residual powder, which is sucked out of the cubicle 3. The pipe 4 is also referred to herein as residual powder pipe. On the inlet side, the pipe 4 has a round cross section and on the outlet side it has a quadrangular cross section.

The pipe 4 comprises a pipe adapter 41, which serves to connect a pipe with a round cross section, which may be, for example, the collecting tube 130 according to FIGS. 14a to e, to a pipe with a quadrangular cross section. The pipe adapter 41 is followed by a bend 42. The bend 42 is a tube that causes a change in direction of the powder-air stream by its curved shape. On the outlet side the bend 42 is connected to a second bend 44 via first and second straight pipe sections 43. This in turn opens into a third straight pipe section 43. The bend 44 and the bend 42 may be of identical construction. But this is not absolutely necessary.

The bend 42 may include a maintenance door 45. Instead of integrating the maintenance door 45 in the bend, the maintenance door 45 may also be provided in the pipe 43. By means of the maintenance door 45 the inside of the pipe may be checked for dirt after a color change and the pipe may be cleaned, if necessary. The maintenance door is shown open in FIGS. 10a to 11c. It is closed during the coating operation.

The components just described, pipe adapter 41, bends 42 and 44 and pipe sections 43 may be made in series and have standard dimensions. They can be produced in stock and serve as standard components. Using these, freely selectable pipe runs can then be formed. The pipe run illustrated in FIGS. 10a, 10b and 10c is merely an example of this. If required, any number of such components can be combined. FIGS. 11a, 11b and 11c show a possible embodiment of the pipe 4 without the pipe adapter 41. If the bend 44 and the pipe 43 have a square cross section, the bend 44 can be mounted in 90° steps on the pipe 43 and so the direction of the further run of the pipe 4 can be set in 90° increments. Also, however, any angles for the further run of the pipe 4 are possible. For this purpose, for example, two bends or two pipes 43 are each connected to a pipe adapter 41 and disposed so that the round cross sections of the pipe adapters 41 lie on each other. Now, any angle can be set for the continuation of the pipes.

The components 41-44 of the pipe 4 may be made of sheet metal.

Figure 12A:
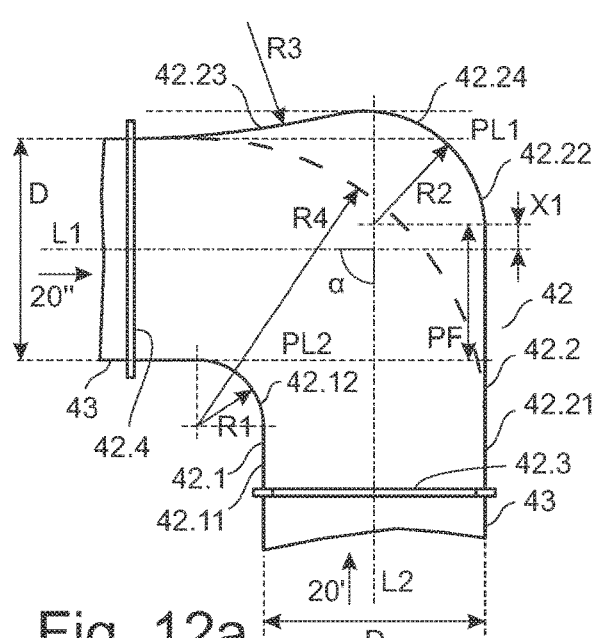
FIG. 12a shows a first possible embodiment of a bend in side view, which can be installed in the pipe for the residual powder-air stream.
Figure 12B:
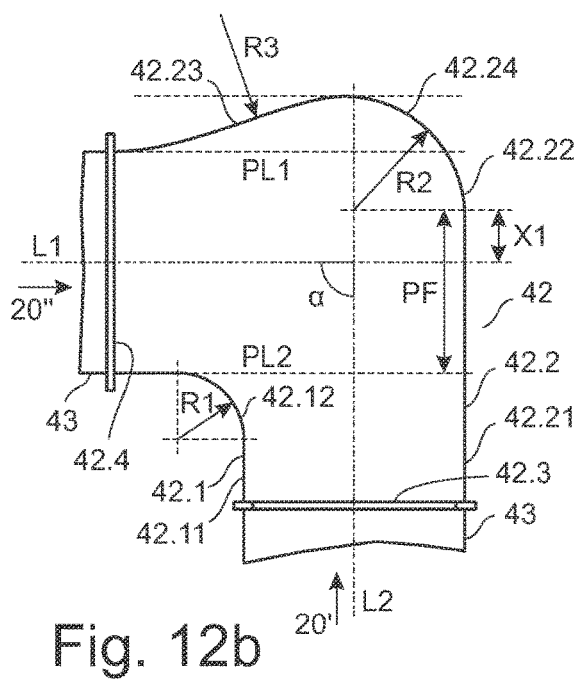
FIG. 12b shows a second possible embodiment of the bend in side view, which can be installed in the pipe for the residual powder-air stream.
Figure 13A:
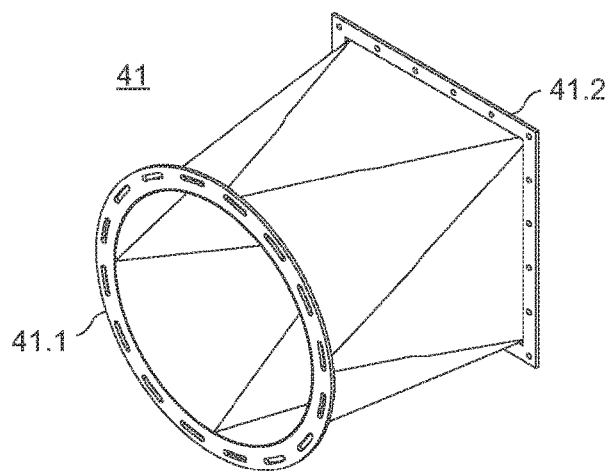
FIGS. 13a, 13b, 13c and 13d show a possible embodiment of the pipe adapter in various views.
Figure 13B:
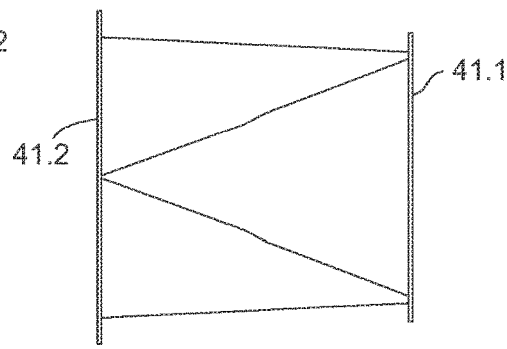
Figure 13C:
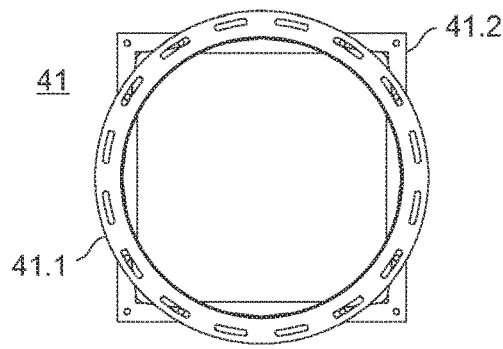
Figure 13D:
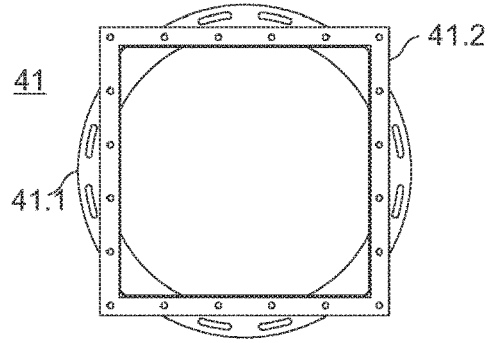
Figure 14A:
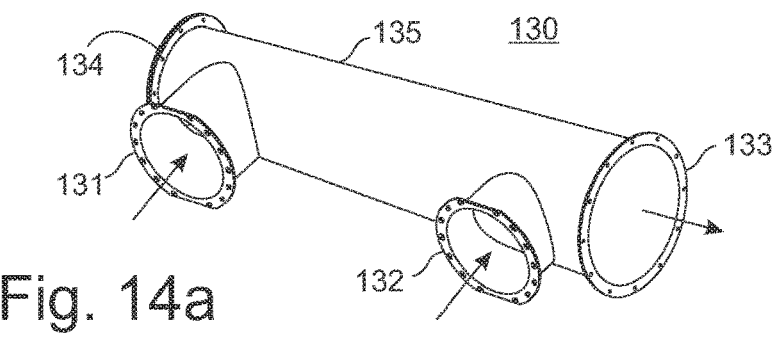
FIGS. 14a, 14b, 14c, 14d and 14e show a possible embodiment of a collecting tube for the residual powder-air stream in various views.
Figure 14B:
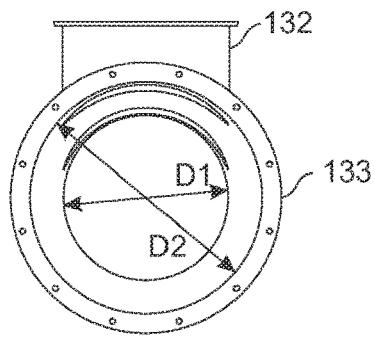
Figure 14C:
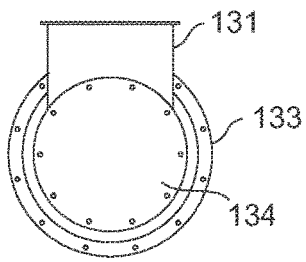
Figure 14D:
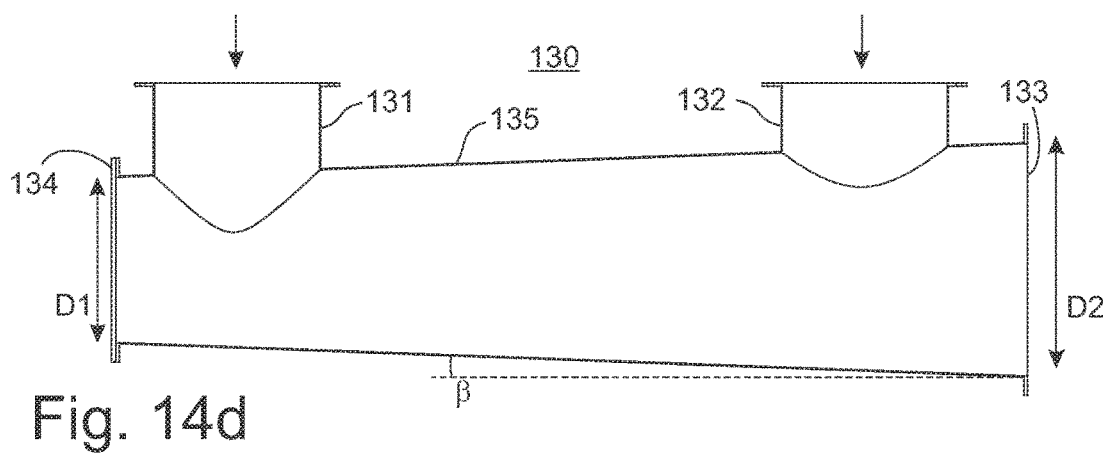
Figure 14E:
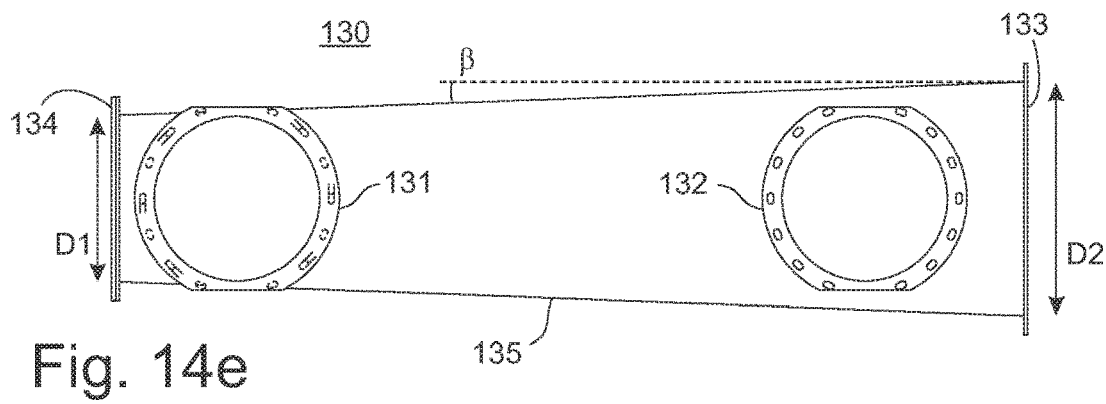

A first possible embodiment of the bend 42 is shown in FIG. 12a and a second possible embodiment of the bend 42 is shown in FIG. 12b in a side view. The bends 42 shown there have an angle of curvature a of 90° based on the two reference axes L1 and L2. The powder-air stream thus exits the bend 42 deflected by 90°. The bend 42 can also be made with any other angle of curvature a. The bend 42 may be a bent sheet tube and may have a round or quadrangular tube cross section. In this case, the wall 42.2 forms the wall opposite to wall 42.1. In the region 42.21, the wall 42.2 runs straight and then has a curvature in the region 42.22, which is also referred to below as an outer curve. The wall 42.1 has a greater curvature than the wall 42.2. The curvature 42.12 is also referred to below as the inner curve.

The wall 42.1 is shorter than the wall 42.2 and is therefore also referred to as a short outer wall 42.1, whereas the wall 42.2 is also referred to as a long outer wall 42.2 of the bend 42.

The curvature of the wall 42.1 may have a constant radius R1 over the entire curvature, but this is not mandatory. In principle, the wall 42.1 can be more or less arbitrarily concavely curved. Advantageously, however, the curvature in the region 42.12 is not so great that—seen from a fluidic point of view—it forms a corner, because otherwise powder could be deposited there.

Curvature is also understood to mean a shape formed by a polygon, which essentially corresponds to the desired curved run. Thus, the curvature can be generated both by a circular arc and by a polygon. For example, a quarter circle can also be formed by a polygon with 4 to 8 corners. Principally, the above applies to all curvatures present in the bend. The number of corners of the polygon should be chosen so large that in the polygon no too pointed corners or too sharp edges arise because otherwise there could be a stall and powder could deposit there. This also applies, mutatis mutandis, to the inner curve and the outer curve of the bend, which can be formed for example by circular arcs, elliptical sections, arc segments or polygons.

The curvature of the opposite wall 42.2 may have a radius R2 in a first region 42.22 of the curvature and a radius R3 in a second region 42.23 of the curvature. In the two regions 42.22 and 42.23, the two curvatures are in opposite directions. Thus, the course of the curvature in the wall 42.2 is first concave and then convex. But it is also possible to make the curvature in the wall 42.2 so that it is first convex and then concave. The entire curvature of the wall 42.2 is designed so that a bulge 42.24 results in the wall 42.2. By the bulge 42.24 the pipe cross section is increased. This ensures that the powder flowing through the bend 42 does not deposit on the wall 42.2 or can even sinter there. In FIGS. 12a and 12b, the bulge 42.24 lies above the projection line PL1, the projection line PL1 being the imaginary rectilinear extension of the outer wall 42.2 of the bend immediately at the opening 42.4. The projection line PL2 is the imaginary rectilinear extension of the outer wall 42.1 of the bend immediately at the opening 42.4.

If the radius R3 of the concave curvature in the region 42.23 is chosen so large to be close to a straight line, then the region 42.23 can also be formed rectilinearly. In this case, the wall in the region 42.23 is formed by an oblique surface, which merges tangentially into the convex curvature in the region 42.22.

The powder-air mixture can flow through the opening 42.3 into the bend 42 and exit the bend through the opening 42.4. In this case, the arrow 20' indicates the direction of flow of the powder-air mixture. The powder-air mixture can flow through the bend 42 also in the opposite direction. In this case, the arrow 20" indicates the direction of flow of the powder-air mixture. In FIG. 11c, the bend 44 is shown in a first mounting position, so that the bulge is located on the top of the bend.

A second possible mounting position of the bend 44 is indicated by the dashed line and the reference numeral 44', with the bulge of the bend being located at the side. Thus, one and the same bend can be installed in the residual powder pipe 4 in two different ways.

If the powder-air stream flows through the opening 42.3 into the bend 42 according to the arrow 20', the powder particles hit the wall 42.2 of the bend in the region of the bulge 42.24. The bulge 42.24 thus serves as a bounce surface for the powder particles. The powder particles are slowed without friction. Since no appreciable friction arises, it is prevented that the particles can sinter there. As a result of the permanent air stream the particles are subsequently transported from there to the outlet opening of the bend. The bounce surface preferably has a width between D/2 and D, wherein D is the width of the opening 42.3 of the bend 42.

As mentioned, however, the flow through the bend 42 can also be in the opposite direction. The powder-air stream then flows according to the arrow 20" through the opening 42.4 into the bend 42. In the region PF, some of the powder particles hit the wall 42.2 of the bend perpendicularly, which thus serves as a bounce surface for these powder particles. The powder particles are slowed there without any friction and thus prevented from being able to sinter there. As a result of the permanent air stream, the particles are subsequently transported from there to the outlet opening of the bend, which in this case is the opening 42.3. The bounce surface PF in this case is that surface of the bend 42 which the powder particles impinge perpendicularly or approximately perpendicularly. The bounce surface PF preferably has a width between D/2 and D, wherein D is the width of the opening 42.4 of the bend 42.

If the powder-air mixture flows into the bend 42 in the direction 20", a larger proportion of the powder hits a surface of the outer wall 42.2 aligned perpendicular to the direction of flow compared to the case where the powder-air mixture flows into the bend 42 in the direction 20'. Thus, the bounce surface PF at the direction" of flow 20 is greater than in the direction 20'. Thus, the risk of sintering in the flow in the direction 20" is even smaller than in the flow in the direction 20'.

The pressure losses are in both cases of similar magnitude, regardless of whether the air stream flows through the bend 42 coming from the direction 20' or 20".

In previously known bends, the long outer wall 42.2 has a radius R4 and extends as shown in dashed lines in FIG. 12a. It can be seen that there is virtually no or only a relatively small bounce surface for the powder particles in the previously known bend. Most of the powder particles hit the long outer wall at a relatively shallow angle. Thereby, the particles are heated by friction, so that they can adhere or sinter to the long outer wall over time.

The bend 42 shown in FIG. 12b differs from the bend according to FIG. 12a by the position and the course of the outer curve. The outer curve 42.22 and 42.24 is further offset outwards relative to the center line or reference axis L1 than is the case in the outer curve according to FIG. 12a. The offset X1 of the center of curvature 42.22 relative to the center line L1 is thus larger at the bend according to FIG. 12b than in FIG. 12a. In addition, the outer curve in the region 42.23 is shaped differently.

FIGS. 13a, 13b, 13c and 13d show a possible embodiment of the pipe adapter 41 in a three-dimensional view, a side view, a view from the front and from behind. The pipe adapter 41 has a round opening 41.1 and a quadrangular opening 41.2. The pipe adapter 41 can be connected to round or square tubes via corresponding flanges.

FIGS. 14a, 14b, 14c, 14d and 14e show a possible embodiment of the collecting tube 130 in various views. In a cubicle with two suction tubes extending in the longitudinal direction of the cubicle for overspray, the two suction tubes open into the two connecting pieces 131 and 132 of the collecting tube 130. The outlet 133 of the collecting tube 130 in turn can be guided on the pipe adapter 41 or connected directly to the residual powder pipe 4, if their pipe cross sections are the same. The end of the collecting tube 130 opposite to outlet 133 is closed with an inspection lid 134. If necessary, the inspection lid 134 can be removed and the interior of the collecting tube 130 can be cleaned. The collecting tube has a first diameter D1 in the region of the inspection lid 134 and a second diameter D2 at the outlet 133, wherein the diameter D1 is smaller than the diameter D2. Thus, the cross section of the collecting tube 130 increases toward the outlet 133, and preferably, the cross section of the collecting tube 130 toward the outlet 133 increases constantly. In this way it is achieved that the flow velocities of the residual powder-air streams in the two suction tubes of the cubicle are the same or almost the same. This has the advantage that about the same amount of air per unit time is sucked off on the one longitudinal side and the other longitudinal side of the cubicle. The angle β indicates the change in the diameter of the collecting tube 130 and depends, inter alia, on the cubicle width. The wider the cubicle, the smaller the angle should be. The angle β is preferably in the range of 1° to 4°. For cubicles with a width of about 2.5 m, the angle β is in the range of 1° to 3°, and even better in the range of 2° to 3°.

Figure 15A:
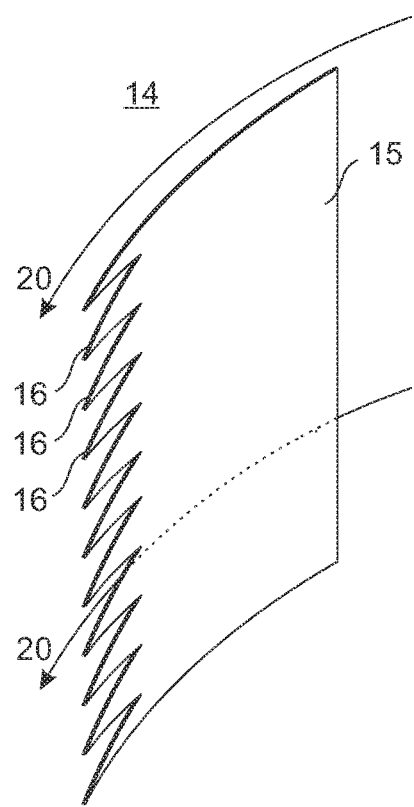
FIGS. 15a and 15b show a possible embodiment of an air baffle in a three-dimensional view and in a side view.
Figure 15B:
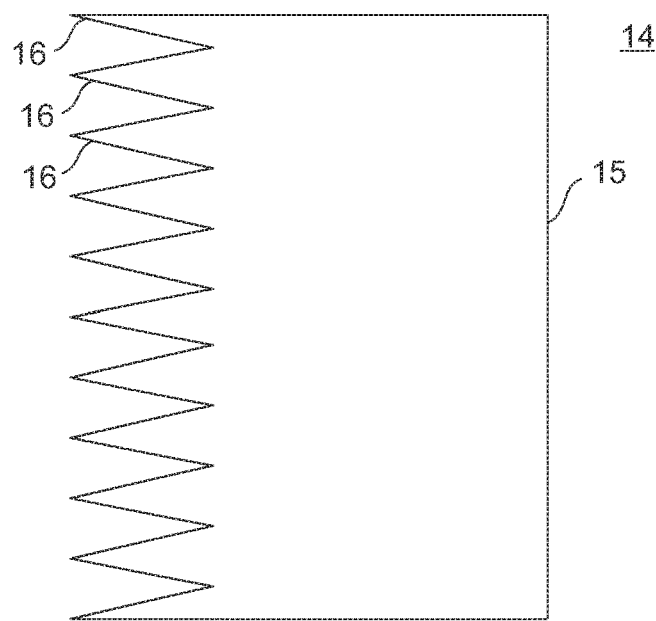

FIG. 15a shows the air baffle 15 in a three-dimensional view and FIG. 15b shows the air baffle 15 in a side view.

The fan-shaped end 16 of the guide blade 14 is located on the downstream side of the guide blade. The advantage is that this can result in no or almost no deposits at this transition in the cyclone separator, because the shedding surface is reduced to a minimum.

The foregoing description of the exemplary embodiments according to the present invention is for illustrative purposes only. Within the scope of the invention various changes and modifications are possible. Thus, for example, the cyclone separator 5 shown in FIGS. 3 and 4 can also be installed in a powder coating system other than shown in FIGS. 1 and 2. The individual components can also be combined with one another in a different way than shown in the figures. Not all blades 51 have to have the same design. Thus, the guide apparatus can also be equipped with differently designed blades 51. For example, the blades 51 may have different angles of inflow ε in the inlet region.

The guide blades 51 may also have serrations or may be fan-shaped in the outlet region 51.1. The outlet region 51.1 can be designed in a similar manner as are the fan-shaped ends 16 of the guide blade 14.

The powder coating system for coating of workpieces with coating powder can be provided with a coating cubicle 3, a cyclone separator 5 and a filter 9, the coating cubicle 3 being connected to the cyclone separator 5 via a residual powder pipe 4. However, it is also possible that the coating cubicle 3 is connected to the filter 9 via the residual powder pipe 4.

LIST OF REFERENCE NUMERALS

1 Powder coating system
2 Spray guns
3 Coating cubicle
4 Residual powder pipe
5 Cyclone separator
5.1 Inlet tract
5.2 Separation tract
5.3 Outlet tract
6 Pipe
7 Fan
9 Post-filter
10 Powder center
11 Workpiece
12 Pipe
13 Suction tube
14 Guide blade
15 Lid of the cyclone separator
16 Fan-shaped ends
20 Powder-air mixture or powder-air stream
21 Inlet
22 Outlet
23 Outlet tube
24 Outer wall of the cyclone separator
25 Powder outlet
26 Supporting structure
27 Transport direction of the powder
28 Air vortex
29 Sieve
30 Vertical or substantially eddy-free air stream
31 Secondary stream
32 Manual coating booth
33 Waste container
41 Pipe adapter
41.1 Round cross section
41.2 Quadrangular cross section
42 Bend
42.1 Wall of the bend
42.11 Region of the wall 42.1
42.12 Region of the wall 42.1
42.2 Wall of the bend
42.21 Region of the wall 42.2
42.22 Region of the wall 42.2
42.23 Region of the wall 42.2
42.24 Bulge
43 Straight tube
44 Bend
45 Maintenance door
50 Guide apparatus
50.1 Inlet region
50.2 Outlet region
51 Blade
51.1 Rectilinear region
51.2 Curvature
51.3 Rectilinear region
52 Cone or truncated cone
55 Cylindrical core
60 Guide apparatus
60.1 Inlet region
60.2 Outlet region
61 Blade
61.1 Rectilinear region
61.2 Curvature
61.3 Rectilinear region
62 Cone
63 Holder
65 Cylindrical core
70 Guide apparatus
70.1 Inlet region
70.2 Outlet region
71 Blade
71.1 Rectilinear region
71.2 Curvature
71.3 Rectilinear region
72 Cone
73 Holder
75 Cylindrical core
80 Guide apparatus
80.1 Inlet region
80.2 Outlet region
81 Blade
81.1 Rectilinear region
81.2 Curvature
81.3 Rectilinear region
82 Cone
83 Holder
84 Cone
85 Cylindrical core
90 Guide apparatus
90.1 Inlet region 90.2 Outlet region
91 Blade
91.1 Rectilinear region
91.2 Curvature
91.3 Rectilinear region
92 Cone
93 Holder
94 Shell
95 Cylindrical core
130 Collecting tube
131 Inlet
132 Inlet
133 Outlet
134 Inspection lid
135 Collecting tube
D1 Diameter
D2 Diameter
D3 Diameter
X1 Distance
R1 Radius
R2 Radius
R3 Radius
R4 Radius
L1 Reference axis
L2 Reference axis
LA Longitudinal axis of the guide apparatus
PL1 Projection line 1
PL2 Projection line 2
PF Bounce surface
α Angle of curvature
β Angle
ε Angle in the inlet region of the blade

The invention claimed is:

1. A powder coating system for coating workpieces with coating powder, wherein
    a coating cubicle and a cyclone separator are provided,
    the coating cubicle is connected to an inlet of an inlet tract of the cyclone separator via a residual powder pipe,
    an outlet tube is provided in the outlet tract of the cyclone separator, in which a guide apparatus is disposed in the outlet tube,
    the guide apparatus has multiple blades which are designed such that the air vortex impinging on the blades can be deflected at least partially into an eddy-free air stream, and
    a guide blade having an edge with a plurality of spaced apart projections is provided in the inlet tract of the cyclone separator.

2. The powder coating system according to claim 1, wherein the blades are disposed radially to the longitudinal axis (LA) of the guide apparatus.

3. The powder coating system according to claim 1, wherein the blades are curved in the inlet region.

4. The powder coating system according to claim 1, wherein at least some of the blades in the inlet region and the longitudinal axis (LA) of the guide apparatus each form an angle (ε) between 40° and 70°.

5. The powder coating system according to claim 1, wherein the blades in the outlet region are designed to be rectilinear.

6. The powder coating system according to claim 1, wherein at least some of the blades in the outlet region have a surface which is aligned parallel to the longitudinal axis (LA).

7. The powder coating system according to claim 1, wherein the guide apparatus tapers on its downstream side.

8. The powder coating system according to claim 1, wherein the guide apparatus has a holder by means of which it can be disposed in the outlet tube.

9. The powder coating system according to claim 1, wherein the guide apparatus tapers on its upstream side.

10. The powder coating system according to claim 1,
    wherein the guide blade is disposed tangentially to the powder-air stream entering the cyclone separator.

11. The powder coating system according to claim 1, wherein
    a residual powder pipe each is disposed along the longitudinal sides of the coating cubicle,
    a collecting tube is provided, which extends transversely to the residual powder pipes and into which the residual powder pipes open,
    the collecting tube has a cross section which widens substantially continuously over the length of the collecting tube.

12. The powder coating system according to claim 1, wherein
    the residual powder pipe has at least one bend to deflect the powder-air stream in another direction
    the bend has a short, curved outer wall and a long, curved outer wall,
    wherein the long, curved outer wall has a bulge.

13. The powder coating system according to claim 12, wherein
    the bend has an inner curve which is part of the short outer wall,
    the bend has an outer curve which is part of the long outer wall,
    the long outer wall has a straight section tangentially followed by the outer curve.

14. The powder coating system according to claim 1, wherein the edge of the guide blade is configured as a serrated edge.

15. The powder coating system according to claim 1, wherein the guide blade curves in a direction of flow through the inlet tract, and wherein the edge is a downstream edge of the guide blade.

16. The powder coating system according to claim 1, wherein the inlet tract defines a main flow path for a powder-air stream, the guide blade extending within the inlet tract tangentially to the main flow path, and the edge of the guide blade is spaced from an interior wall forming a portion of the inlet tract to permit flow of the powder-air stream thereacross.

* * * * *